United States Patent

Pinna

[11] Patent Number: 5,646,956
[45] Date of Patent: Jul. 8, 1997

[54] SYSTEM AND METHOD FOR ESTIMATING TOP CONTRIBUTORS

[75] Inventor: Robert W. Pinna, Colorado Springs, Colo.

[73] Assignee: Hewlett-Packard Company, Palo Alto, Calif.

[21] Appl. No.: 599,196

[22] Filed: Feb. 9, 1996

Related U.S. Application Data

[63] Continuation of Ser. No. 791,713, Nov. 14, 1991, abandoned.

[51] Int. Cl.$^6$ ............................................. H04B 3/46
[52] U.S. Cl. ..................... 345/224; 340/825.15; 370/241
[58] Field of Search ........................ 375/224; 370/13, 370/17, 60, 94.1; 340/825.52, 825.15

[56] References Cited

U.S. PATENT DOCUMENTS

| | | | |
|---|---|---|---|
| 4,597,078 | 6/1986 | Kempf | 370/94.1 |
| 4,775,973 | 10/1988 | Tomberlin et al. | 370/94.1 |
| 4,792,753 | 12/1988 | Iwai | 370/94.1 |
| 4,817,080 | 3/1989 | Soha | 370/17 |
| 4,849,968 | 7/1989 | Turner | 370/94.1 |
| 4,933,937 | 6/1990 | Konishi | 370/94.1 |
| 4,996,524 | 2/1991 | Tojima | 340/825.52 |
| 5,038,345 | 8/1991 | Roth | 370/60 |
| 5,097,469 | 3/1992 | Douglas | 370/85.5 |

FOREIGN PATENT DOCUMENTS

| | | | |
|---|---|---|---|
| 0265106A2 | 4/1988 | European Pat. Off. | H04L 11/08 |
| 0269978A2/A3 | 6/1988 | European Pat. Off. | H04L 11/16 |
| WO88/06822 | 9/1988 | WIPO | H04L 11/08 |

OTHER PUBLICATIONS

*A Distributed Approach To LAN Monitoring Using Intelligent High Performance Monitors*, Michael Soha, 8302 I.E.E.E. Network 1 (1987) Jul., No. 3, New York, NY, U.S.A.

Primary Examiner—Stephen Chin
Assistant Examiner—T. Ghebretinsae

[57] ABSTRACT

A system and method for estimating top contributing stations of a local area network. A traffic analyzer of the present invention determines the top N stations producing and receiving traffic on a local area network. The traffic analyzer performs this technique with limited storage space. To determine the top contributors the present invention utilizes a method of matching, sorting, creating, and purging records in storage in relation to captured frames received from stations on the LAN.

7 Claims, 8 Drawing Sheets

| LOCATION IN USE FIELD 502 | STATION ADDRESS FIELD 504 | TRAFFIC COUNT FIELD 506 | |
|---|---|---|---|
| 0 | IN USE | ADDRESS | TRAFFIC | ← RECORD A |
| 1 | IN USE | ADDRESS | TRAFFIC | |
| 2 | IN USE | ADDRESS | TRAFFIC | |
| 3 | IN USE | ADDRESS | TRAFFIC | ← RECORD D |

TABLE 501

FIG 5

SYSTEM AND METHOD FOR ESTIMATING TOP CONTRIBUTORS

CROSS REFERENCE TO RELATED APPLICATIONS(s)

This is a continuation of application Ser. No. 07/791,713 filed on Nov. 14, 1993, now abandoned.

BACKGROUND OF THE INVENTION

1. Field of the Invention

The present invention relates generally to a system and method for estimating top contributors of a network. More particularly, the present invention relates to a system and method for estimating top contributing stations producing traffic on a network over a finite period of time.

2. Related Art

A local area network (LAN) is a data communication system with more than one independent device and the ability for any one device to communicate with any other device or point in the system.

One key interest in LANs is the ability to manage and control traffic communication between stations. In order to avoid "traffic jams" or network "pollution" and to increase throughput and response time of a network, it is necessary to identify which stations are contributing the most data to the network. For example, during a "broadcast storm" (a state in which there are a very large number of broadcast frames being sent, and consequently the network is effectively shut down) it is important to identify the top producers of broadcast traffic. Once this information is available, appropriate adjustments may be implemented to correct the condition.

In addition, identifying the top producers of traffic which do not serve any useful purpose or consume a large percentage of a network's resources is critical information that a network manager needs to know in order to design an efficient network system, which operates at a lower cost.

One method of identifying the top contributors to a network involves maintaining a table of entries for each station contributing data to the network. As each station sends data, the source address of the station is recorded in a table. The table is updated each time a station sends data. At the end of a particular time interval, the table is sorted to determine the top contributing entries.

However, this technique is impractical. Often the amount of possible stations is very large and storage space is limited. Frequently, the amount of stations contributing to the network extends beyond the capacity of the maximum number of entries the memory device can store. As a result, most techniques ignore any new stations contributing to a network after the number of entries exceeds the capacity of the memory device. This leads to inaccurate results. Additionally, the large table sizes employed for this technique requires increased time to process and sort such information.

SUMMARY OF THE INVENTION

The present invention accurately estimates the top contributors to a LAN utilizing a fixed amount of memory.

According to the present invention, a traffic analyzer monitors the LAN. The traffic analyzer captures at least one frame transmitted on the LAN and forwards the frames to a traffic analyzer block. The traffic analyzer block has a table records consisting of a location in use field, a station address field and a traffic count field. The traffic analyzer block increments the traffic field count of existing records having a station address field which matches a source address of the frame. The table of records are then sorted in ascending order according to the traffic field count value of each record. Once the amount of records is exceeded by the number of stations being monitored, the traffic analyzer block removes records from the table of records possessing a low traffic count field by a predetermined factor. Subsequently, the traffic analyzer re-executes the aforementioned steps.

A feature of the present invention is the ability to accurately estimate the top contributing stations of a LAN utilizing a fixed amount of memory, which is significantly less than what present devices require.

A further feature of the present invention is that it is cheaper to manufacture than present protocol analyzers.

Further features and advantages of the present invention, as well as the structure and operation of various embodiments of the present invention, are described in detail below with reference to the accompanying drawings.

BRIEF DESCRIPTION OF THE DRAWINGS

The present invention will be described with reference to the accompanying drawings, wherein:

FIG. 5 illustrates an example of a table 501 of records.

In the drawings, like reference numbers indicate identical or functionally similar elements. Additionally, the left-most digit of a reference number identifies the drawing in which the reference number first appears.

DETAILED DESCRIPTION OF THE PREFERRED EMBODIMENTS

The present invention is directed to a system and method for estimating top contributors of a communications network.

Figure 1:
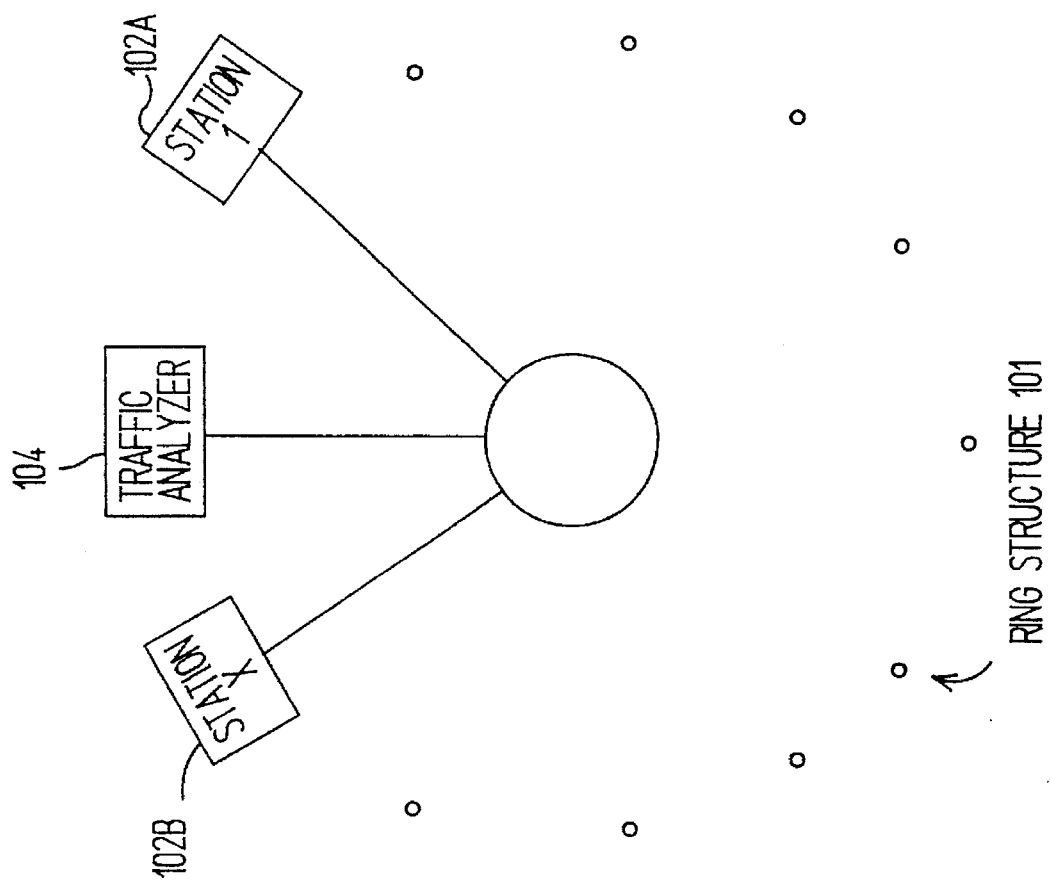
FIG. 1 illustrates one example of an environment in which the present invention operates.

FIG. 1 illustrates one example of an environment in which the present invention operates. In particular, FIG. 1 is a block diagram of an 802.5 ring structure local area network (LAN) 101 according to the Institute of Electrical and Electronic Engineers (IEEE). The 802.5 ring structure LAN 101 includes stations 102 and a traffic analyzer 104 to be described.

Figure 2:
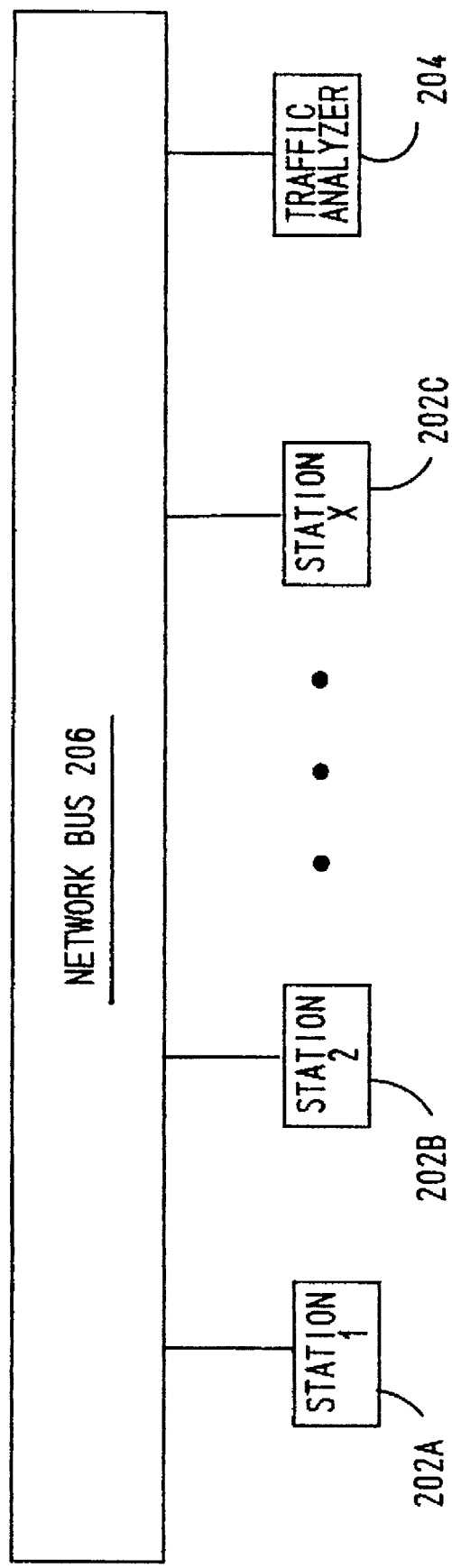
FIG. 2 illustrates a second example of an environment in which the present invention operates.

FIG. 2 illustrates a second example of an environment in which the present invention operates. In particular, FIG. 2 is a block diagram of an 802.3 bus structure LAN 201 according to the IEEE. The 802.3 bus structure LAN 201 includes stations 202 and a traffic analyzer 204 to be described. Operations of FIGS. 1 and 2 are essentially identical. For discussion purposes, the elements of FIG. 2 shall be referred to herein.

Figure 3:
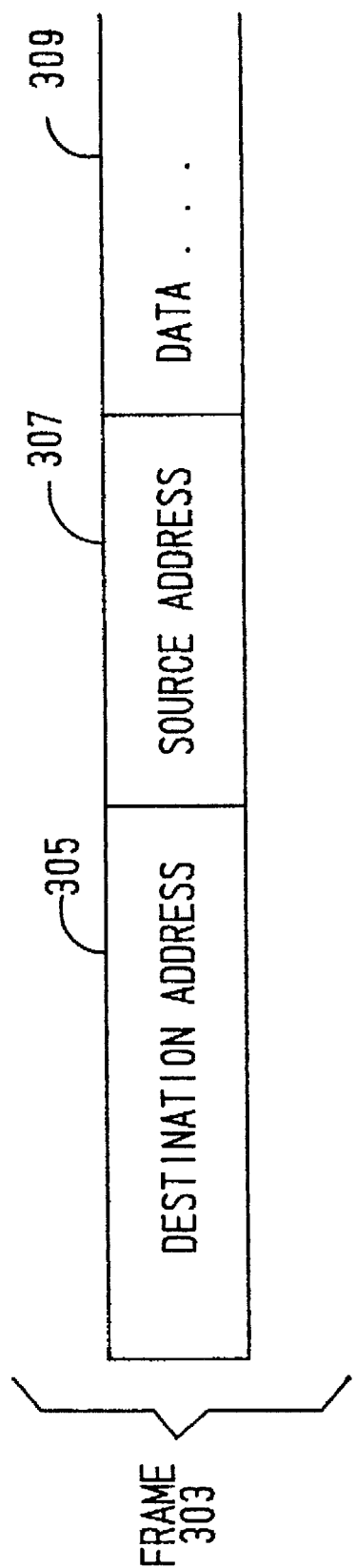
FIG. 3 illustrates an example of a frame 303.

In FIG. 2, stations 202A through 202C (where C represents any number integer) exchange information via the network bus 206. Information is transmitted in the form of a frame. A frame is a group of bits that make up a packet of data for transmission by stations 202 or other devices. FIG. 3 illustrates a typical frame 303 which includes a destination address 305, a source address 307, and data 309. Each station sending traffic on the network bus 206 inserts its address into the source address field of the frame 303. Each station 202 on the network bus 206 monitors each frame 303. When a station 202 on the network bus 206 recognizes a frame 303 with a destination address 305 which matches the station's own address, the frame 303 is received by the station 202.

Figure 4:
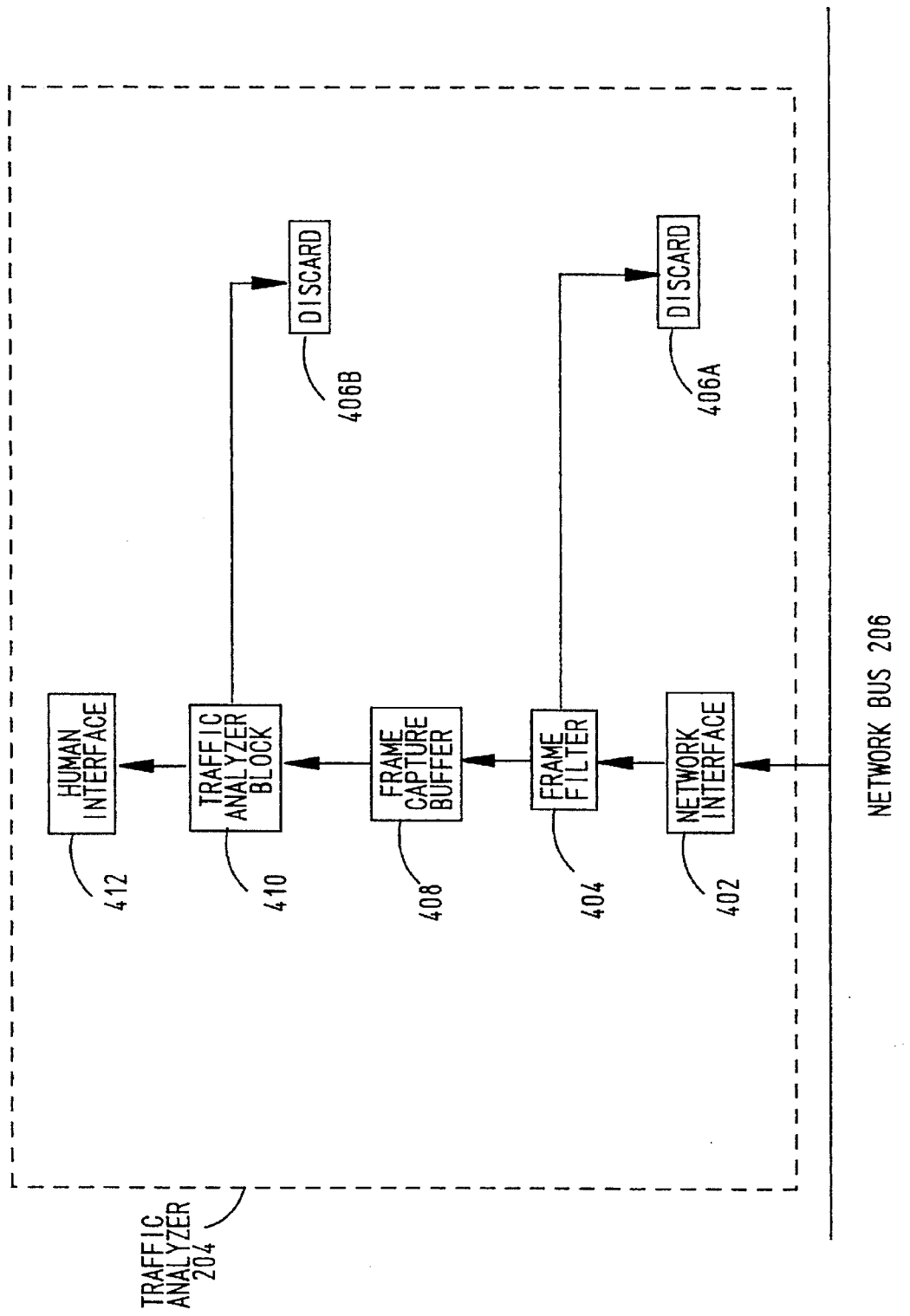
FIG. 4 illustrates a high level block diagram of a protocol analyzer or a traffic analyzer.

FIG. 4 illustrates a high level block diagram of a traffic analyzer. The term "traffic analyzer" and "protocol analyzer" may be used interchangeably. For discussion purposes the term traffic analyzer is used.

As illustrated in FIG. 4, the traffic analyzer 204 of the present invention includes a network interface 402, frame filtering 404, discard 406, a frame capture buffer 408, a protocol or traffic analyzer block 410, and an interface 412. The structure of these elements are well known to those skilled in the art.

Figure 6:
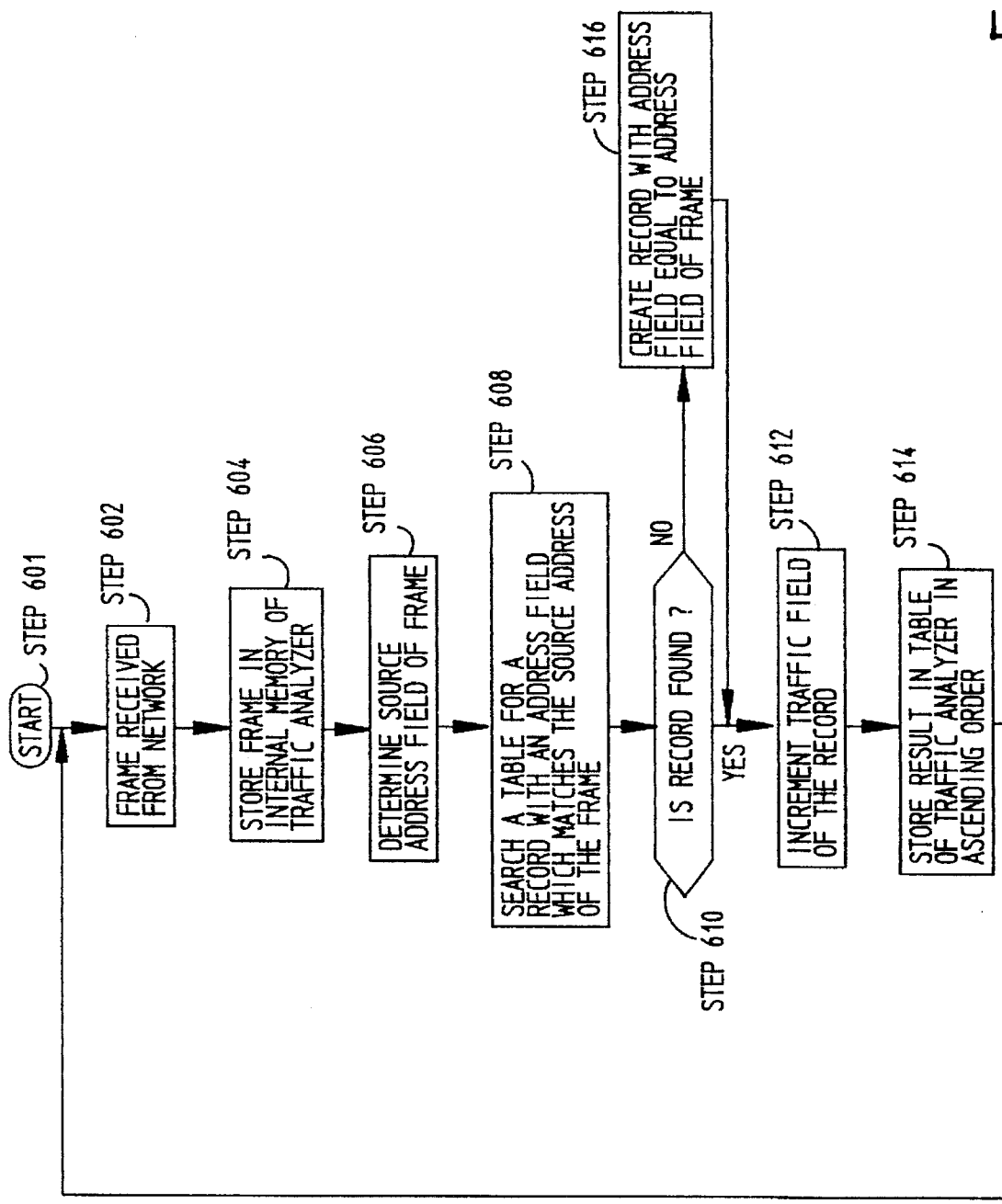
FIG. 6 illustrates a flow chart according to the present invention.
Figure 7:
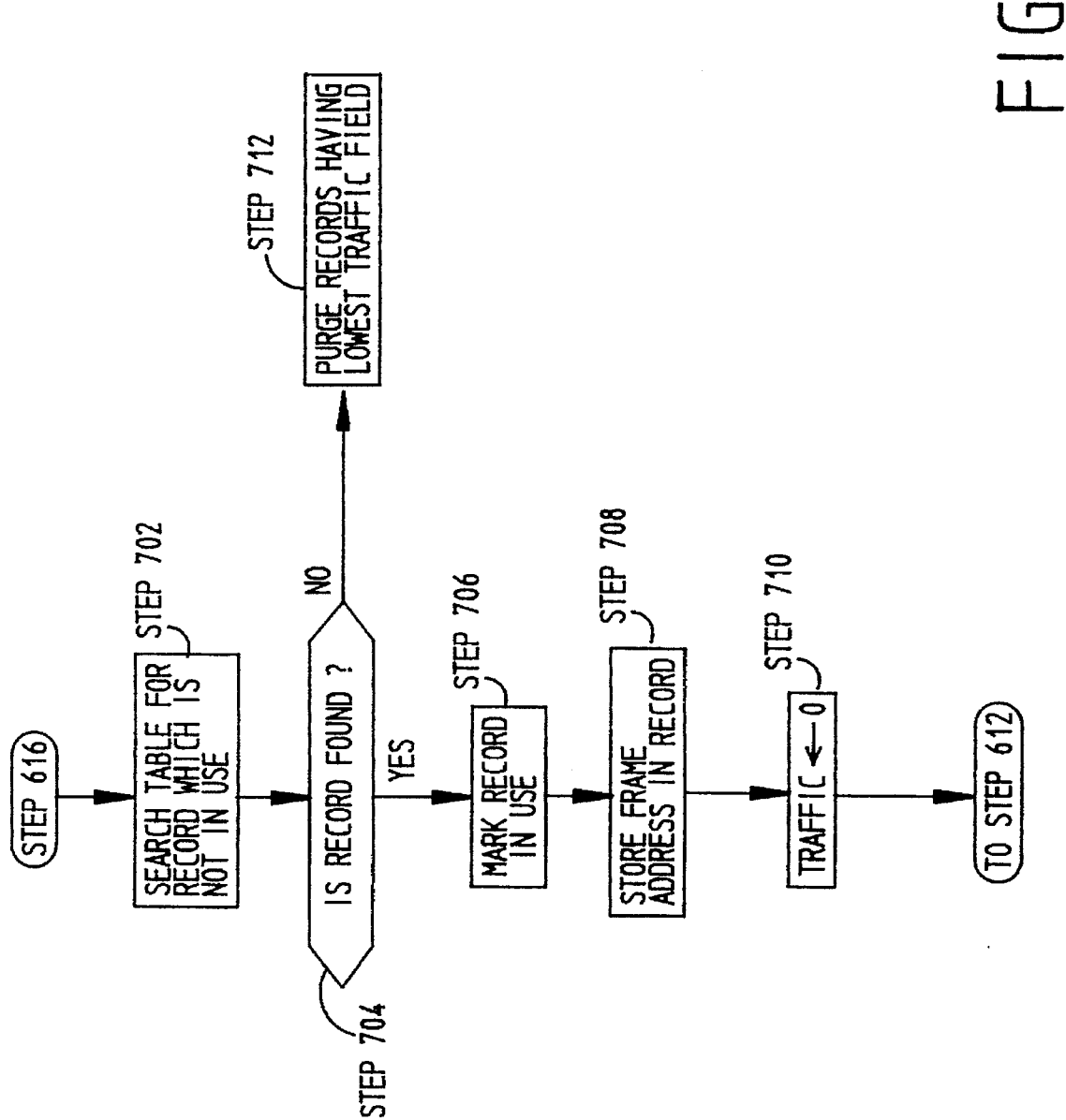
FIG. 7 illustrates a detailed flow chart describing step 616 of FIG. 6.
Figure 8:
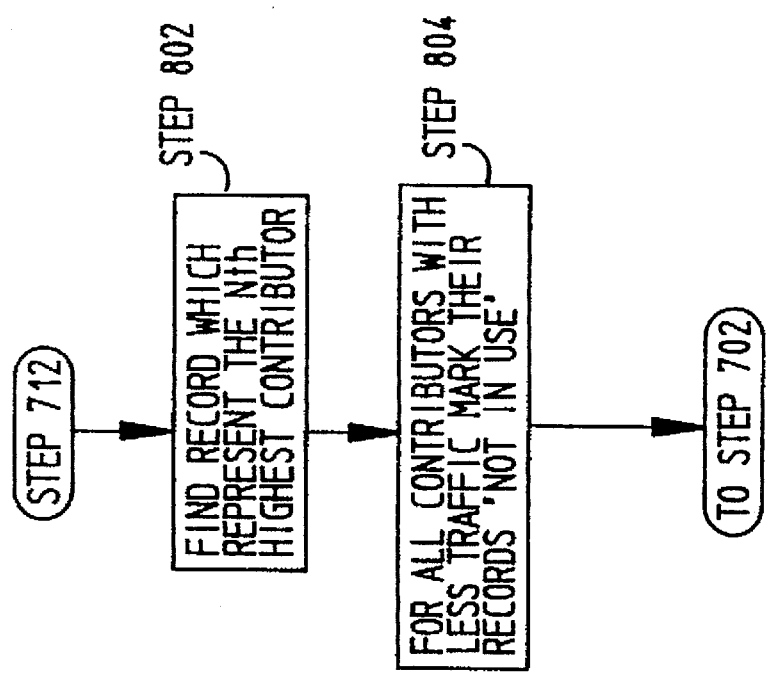
FIG. 8 illustrates a detailed flow chart describing step 712 of FIG. 7.

The operation of the traffic analyzer 204 is generally illustrated in the flow chart shown in FIGS. 6, 7 and 8. Referring to FIG. 6, in step 602 the network interface 402 captures the frames 303 from the network bus 206. The network interface 402 captures all frames 303 on the network bus 206, regardless of addressing information or error status of the frames 303. The network interface 402 is a combination of hardware and firmware for capturing frames 303. Coupled to the network interface 402 is the frame filter 404, which analyzes frames 303 and eliminates undesired data via a discard 406. For example on an IEEE 802.5 network 101, a "token" (continuously repeating data that appears on the network bus 206) may be filtered and discarded via the discard 406A.

In step 604, the frames 303 that pass through the frame filter 404 are received by the frame capture buffer 408. The frame capture buffer 408 stores the frames 303 temporally for transfer to the traffic analysis block 410. The traffic analysis block 410 removes each frame 303 received by the frame capture buffer 408. Once a frame 303 is received by the traffic analysis block 410, the frame 303 is then recorded in a table of memory (to be described) within the traffic analyzer block 410. The frame 303 is then discarded via a discard 406B.

FIG. 5 illustrates an example of such a table 501. Each line of the table 501 represents a record. Each record maintains the following fields (columns): location in use field 502, station address field 504, and traffic count field 506. The location in use field 502 is a "boolean" field. In other words, the location in use field 502 either takes a value of TRUE or FALSE. The location in use field 502 is marked FALSE if a record is not being used and TRUE if a record is being used. Initially, all records in Table 501 are marked FALSE to indicate that the records are not in use.

The size of Table 501 is fixed regardless of the number of stations 202. The size of table 501 ranges from 0 to [i−1], where [i] is the size of the table measured by the maximum amount of table entries. In other words, for a table of size [i], where i=100, there are 100 entries labeled from table[0] to, table[99].

Now, referring back to FIG. 6. In step 606, the traffic analyzer block 410 determines the source address 307 of the frame 303 identifying the station 202, which sent the frame 303 onto the network bus 206.

In step 608, the traffic analyzer block 410 attempts to match the source address 307 or the frame 303 with a record with a station address 504 field identical to the source address 307. This is performed by iterating through the table 501 and looking for the condition:

(table[i].inUse=TRUE) AND (table[i].address=frame. source address)

In step 610 and in step 616, if no record is found that matches the source address 307 of the frame 303 then a failure indication is returned. A procedure of obtaining a new record is performed, which is discussed below in step 616.

In step 610 and in step 612, if a record is found with the station address 504 field that matches the source address 307 of the frame 303, then the traffic count field 506 of a record found is incremented. In step 614, the table 501 is sorted in ascending order based on the traffic count field 502. In other words, Table[0] will possess the highest valued traffic field count 502 and Table[1] will possess the second highest valued traffic count 502 and so forth. Other methods of sort may be utilized. The traffic analysis block will then return to step 602 and the process will be repeated.

In step 616, the traffic analyzer block 410 will create a record with a station address field 504 that matches the source address 307 of the frame 303.

FIG. 7, illustrates step 616 in more detail. In step 702, the traffic analyzer block 410 searches the table 501 for a record which is not in use. This is performed by iterating through the table 501 until a record is found which is not in use. If a record is not found, then as shown in step 712, the traffic analyzer block 410 purges records having the lowest traffic fields. Once the table 501 is purged, the traffic analyzer block 410 returns to step 702. The purging process of step 712 will be described in greater detail below.

Once a record is found that is not in use, the traffic analyzer proceeds from step 704 to step 706. In step 706, the record not in use is marked as being in use. Thus the location in use field 502 takes the value TRUE.

In step 708, the source address 307 of the frame 303 is stored in the station address field 504 of the record. The traffic counter field 506 is then marked to zero and returned to step 612 of FIG. 6.

Step 712 will now be described in greater detail. FIG. 8 illustrates step 712. In step 802, the traffic analyzer block 410 finds a record which represents an Nth highest contributor, where N represents a number which is some portion of all contributing frames to the table 501. Thus, step 802 would be labeled as $$i = \frac{\text{size of table}}{\text{"prune divisor"}}.$$

For example, it may be desired to find the midpoint of tabulated fames 303 contributing to the table 501. Step 802 would read $$i = \frac{\text{size of table}}{2}.$$

In this example, the prune divisor would equal 2.

In step 804, all traffic fields of records with less traffic than the Nth highest traffic count fields 506 are marked as not in use. Thus using the example above, all records from the midpoint (or any point depending on the prune divisor) to the end of the table 501 are set to table[i].inUse=FALSE. Thus, the least contributing members are purged.

The system and method for determining top contributors producing traffic may also be applied to top stations receiving traffic. The term "traffic" includes sending as well as receiving and includes all classes of traffic. Thus, it would be obvious for those skilled in the art to apply the present invention to all applications of "traffic."

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A system for determining the top contributors of traffic on a network, the system comprising:

means for capturing frames from a network; and traffic analysis means for recording and maintaining traffic contributor information, operably coupled to said means for capturing frames, said traffic analysis means maintaining a table of records, wherein each of said records having a location in use field, a station address field, and a traffic count field, and wherein said traffic analysis means includes:

means for matching a source address of a frame with a station address field entry, means for sorting said table of records in ascending order according to traffic count field entries, means for creating a new record, wherein said means for creating enters a new record only if said source address does not match any station address field entry, and means for purging a plurality of records, by marking said location in use field of each of said plurality of records to not in use, when said source address does not match any station address field entry and no location in use field entry is marked not in use.

2. The system of claim 1, wherein:

said means for creating includes marking said location in use field as in use, storing said source address in said station address field of said new record, and setting said traffic count field to zero.

3. The system of claim 1, wherein:

said means for purging includes finding a record in said table which represents a Nth highest contributor and marking records, as not in use, which have traffic count field entries less than a traffic count field entry of said Nth highest contributor, thereby purging said plurality of records.

4. A program storage device readable by a machine, tangibly embodying a program of instructions executable by the machine to perform method steps for estimating the top N contributors of traffic on a communications network, wherein N is an integer greater than zero, the method steps comprising:

(a) monitoring the communications network;

(b) capturing a frame on the communication network;

(c) forwarding said frame to a traffic analyzer block, said traffic analyzer block having a table of records, each of said records having a location in use field, a station address field, and a traffic count field;

(d) incrementing a traffic count field entry of one of said records which has a station address field entry that matches a source address of said frame;

(e) creating new record, when no station address field entry matches said source address and marking said location in use field of said new record as in use;

(f) sorting said table in ascending order according to traffic count field entries;

(g) repeating steps (a) through (f) until all of said records are marked as in use and no station address field entry matches a new source address; and (h) marking a plurality of said records as not in use, wherein each of said plurality of said records has a traffic count field entry less than a traffic count field entry of a Nth highest contributor; and (j) repeating steps (a) though (h).

5. The program storage device of claim 4, wherein N is determined by dividing the number of said records by a prune divisor.

6. A method for determining the top N stations on a communications network utilizing a traffic analyzer which maintain a table of records in a limited storage space, wherein each of the records includes a location in use field, a station address field, and a traffic count field and wherein N is an integer greater than zero, the method comprising:

(a) receiving a frame from the communications network;

(b) storing said frame in internal memory of the traffic analyzer;

(c) determining a source address of said frame;

(d) searching the table for an existing record with a station address field entry matching said source address of said frame;

(e) if a match is found, updating said existing record, including:

(i) incrementing a traffic count field entry of said existing record, (ii) storing said existing record in the table and sorting the table in ascending order to traffic count field entries, and (iii) returning to step (a);

(f) searching the table for one of said records with a location in use field entry marked not in use;

(g) if said record is found, creating a new record with the station address field equal to said source address of said frame, including:

(i) marking the location in use field of said new record in use, (ii) storing said source address in the station address field of said new record, (iii) marking the traffic count field to zero, and (iv) returning to step (e) ; and (h) purging a plurality of records having low traffic count field entries, including:

(i) finding a record in the table which represents a Nth highest contributor, (ii) marking, as not in use, all records with a traffic count field entry less than a traffic count entry of said Nth highest contributor, thereby purging said plurality of records, and (iii) returning to step (f).

7. The method of claim 6, wherein N is determined by dividing the number of records by a prune divisor.

* * * * *